United States Patent
Sitter, Jr.

(10) Patent No.: US 8,279,449 B2
(45) Date of Patent: Oct. 2, 2012

(54) ALL-REFLECTIVE, RADIALLY SHEARING INTERFEROMETER

(75) Inventor: David N. Sitter, Jr., Torrance, CA (US)

(73) Assignee: Raytheon Company, Waltham, MA (US)

(*) Notice: Subject to any disclaimer, the term of this patent is extended or adjusted under 35 U.S.C. 154(b) by 138 days.

(21) Appl. No.: 12/946,640

(22) Filed: Nov. 15, 2010

(65) Prior Publication Data
US 2012/0120410 A1 May 17, 2012

(51) Int. Cl.
*G01B 9/02* (2006.01)
(52) U.S. Cl. ...................................... 356/520
(58) Field of Classification Search .......... 356/508, 356/510, 520
See application file for complete search history.

(56) References Cited

U.S. PATENT DOCUMENTS

| | | | | |
|---|---|---|---|---|
| 4,537,473 A * | 8/1985 | Maschmeyer | ............... | 356/513 |
| 4,609,822 A * | 9/1986 | Roche | ............... | 250/352 |
| 4,946,280 A * | 8/1990 | Horton | ............... | 356/508 |
| 6,721,057 B1 * | 4/2004 | Reininger | ............... | 356/520 |
| 7,633,624 B1 * | 12/2009 | Wickholm | ............... | 356/450 |
| 7,733,500 B2 * | 6/2010 | Nishikawa et al. | ............... | 356/512 |

OTHER PUBLICATIONS

Malacara, D., Optical Shop Testing, John Wiley & Sons, Inc., Chptr. 5 (1992).
Handbook of Optics, vol. II, Second Ed., McGraw-Hill, Inc., New York, Chptr. 18, p. 8 (1995) (TOC).

* cited by examiner

*Primary Examiner* — Michael A Lyons
(74) *Attorney, Agent, or Firm* — Daly, Crowley, Mofford & Durkee, LLP

(57) ABSTRACT

A radially shearing interferometer including a beam splitter configured to form two optical beams from entering light, the optical beam including a magnified beam and a demagnified beam; a plurality of mirrors arranged so as to generate the magnified and demagnified beams and provide a common optical path with the beams traversing the plurality of mirrors in the opposite direction back to the beam splitter, the plurality of mirrors including a pair of parabolic mirrors, the first of the pair configured to receive one of the magnified and demagnified beams, and reflect the first received beam to a flat mirror configured to reflect the first received beam to the other of the pair. An imaging device may be positioned at a pupil plane of the magnified beam and the demagnified beam so as to record the interference of both beams. A method for recording an interferogram is also disclosed.

20 Claims, 9 Drawing Sheets

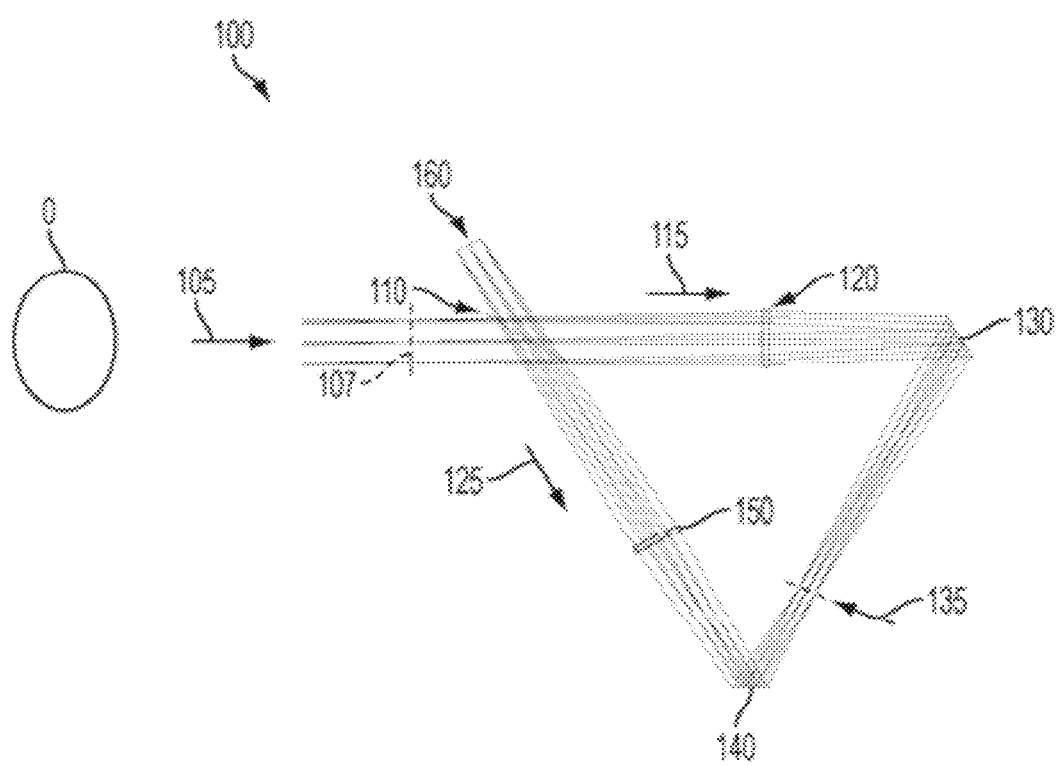
FIG. 1
CONVENTIONAL

MAGNIFIED PATH PRESCRIPTION

| SURF | DESCRIPTION | RD | CC | Y DECENTER | ALPHA TILT (DEGREE) | TYPE | THICKNESS | SEMI APERTURE | APERTURE DECENTER |
|---|---|---|---|---|---|---|---|---|---|
| 227 | ENTRANCE PUPIL | INFIN | 0 | 0 | 0 | AIR | 138.354 | 25 | 0 |
| - | TILT BEFORE BS | INFIN | 0 | 0 | -30 | AIR | 0 | - | - |
| 210 | BEAM SPLITTER (BS) | INFIN | 0 | 0 | 0 | REFLECT | 0 | 65 | -0.28 |
| - | TILT AFTER BS | INFIN | 0 | 0 | -30 | AIR | -145.012 | - | - |
| 220 | FIRST MIRROR | 525.329 | -1 | 61.0034 | 0 | AIR | 296.984 | 30 | 61.0 |
| - | TILT BEFORE SECOND MIRROR | INFIN | 0 | 0 | -30 | AIR | 0 | - | - |
| 230 | SECOND MIRROR | INFIN | 0 | 0 | 0 | REFLECT | 0 | 6 | -8 |
| - | TILT AFTER SECOND MIRROR | INFIN | 0 | 0 | -30 | AIR | -391.5 | - | - |
| 240 | THIRD MIRROR | 850 | -1 | -100 | 0 | REFLECT | 252.401 | 45 | -100 |
| - | DECENTER/TILT BEFORE BS | INFIN | 0 | 0 | -30 | AIR | 0 | - | - |
| 210 | BEAM SPLITTER (AGAIN) | 0 | 0 | 0 | 0 | REFLECT | 0 | 65 | -0.28 |
| - | TILT AFTER BS | 0 | 0 | 0 | -30 | AIR | -138.354 | - | - |
| 250 | EXIT PUPIL/DETECTOR PLANE | 0 | 0 | 0 | 0 | AIR | 0 | - | - |

FIG. 2C

DEMAGNIFIED PATH PRESCRIPTION

| SURF | DESCRIPTION | RD | CC | Y DECENTER | ALPHA TILT (DEGREE) | TYPE | THICKNESS | SEMI APERTURE | APERTURE DECENTER |
|---|---|---|---|---|---|---|---|---|---|
| 207 | ENTRANCE PUPIL | INFIN | 0 | 0 | 0 | AIR | 138.354 | 25 | 0 |
| - | TILT BEFORE BS | INFIN | 0 | 0 | 40 | AIR | 0 | - | - |
| 210 | BEAM SPLITTER (BS) | INFIN | 0 | 0 | 0 | TRANSMIT | 0 | 85 | -0.28 |
| - | TILT AFTER BS | INFIN | 0 | 0 | 80 | AIR | 252.401 | - | - |
| 208 | THIRD MIRROR | -350.000 | -1 | -100.000 | 0 | AIR | -351.500 | 45 | 100 |
| - | TILT BEFORE SECOND MIRROR | INFIN | 0 | 0 | 30 | AIR | 0 | - | - |
| 209 | SECOND MIRROR | INFIN | 0 | 0 | 0 | REFLECT | 0 | 6 | 0 |
| - | TILT AFTER SECOND MIRROR | -525.339 | 0 | 0 | 30 | AIR | 296.104 | - | - |
| 208 | FIRST MIRROR | 0 | -1 | 0 | 0 | REFLECT | -145.012 | 30 | -61.8 |
| - | DECENTER/TILT BEFORE BS | INFIN | 0 | -61.8004 | 80 | AIR | 0 | - | - |
| 210 | BEAM SPLITTER (AGAIN) | 0 | 0 | 0 | 0 | TRANSMIT | 0 | 85 | -0.28 |
| - | TILT AFTER BS | 0 | 0 | 0 | 40 | AIR | -139.354 | - | - |
| 220 | EXIT PUPIL/DETECTOR PLANE | 0 | 0 | 0 | 0 | AIR | 0 | - | - |

FIG. 2D

ALL-REFLECTIVE, RADIALLY SHEARING INTERFEROMETER

BACKGROUND

This application generally relates to interferometry, and in particular, to an all-reflective, radially shearing interferometer.

Interferometry is a technique for diagnosing the properties of two or more waves by studying the pattern of interference created by their superposition. There are various types of known interferometers. These may include, for instance, Newton, Fizeau, Twyman-Green, lateral shearing, and radially shearing interferometers.

One known radially shearing interferometer beam splits an entering wavefront into two beam paths which have different magnification. The two beams are then recombined and interfered. See, e.g., Daniel Malacara, *Optical Shop Testing*, John Wiley & Sons, Inc., 1992, Chapter 5, herein incorporated by reference.

FIG. 1 illustrates a schematic of conventional radially shearing interferometer 100 which includes refractive elements. As illustrated, interferometer 100 is configured in a cyclical geometry. For clarity, light rays have been traced in only one direction.

Collimated light beam 105 from distant object O enters entrance pupil 107 of interferometer 100 and impinges upon beam splitter 110. A portion of beam 105 passes through beam splitter 110 and a portion of beam 105 is reflected by beam splitter 110, yielding first beam portion 115 and second beam portion 125, respectively. Interferometer 100 is known as a "common path" design since both first and second beam portions 115, 125 traverse the same path but in reverse order, as described in the following paragraphs. In a common path configuration, the optical path lengths of the two paths are identical. This feature becomes more important as the spectral width of the light increases and the corresponding coherence length decreases.

First beam portion 115 passes through beam splitter 110. Next, first beam portion 115 passes through first lens 120, is reflected by first mirror 130 through intermediate image location at 135, is reflected by second mirror 140, is re-collimated by second lens 150 and then passes back through beam splitter 110 to exit pupil location 160. First and second mirrors 130, 140 are both flat mirrors. First beam portion 115 experiences a spatial magnification, M, given by the ratio of the focal length of second lens 150 divided by the focal length of first lens 120.

Second beam portion 125 is reflected from beam splitter 110. Next, second beam portion 125 passes through second lens 150, is reflected by second mirror 140 through intermediate image location at 135, is reflected by first mirror 130, is re-collimated by first lens 120 and is reflected by beam splitter 110 to exit pupil 160.

Second beam portion 125 experiences a spatial magnification, $$\frac{1}{M},$$

given by the ratio of the focal length of lens 120 divided by the focal length of second lens 150. A sensor or other detector (not shown) may be located at exit pupil 160 to record the interference pattern generated by the first and second beam portions 115, 125.

First and second lenses 120, 150 scale beams 115 and 125 with reciprocal magnifications depending on the direction of the light through the lenses. This refractive interferometer design, however, is limited in spectral range due to the dispersion of the glass material of the lenses. In addition, wavefront correction is complicated by the lenses. As such, to correct aberrations of the refractive elements adequately, the focal ratio (or f-number) of the lenses must be large (e.g., greater than about F/8), multiple lenses are needed, and/or aspherical lenses are utilized.

Thus, an improved radially shearing interferometer is desired which overcomes the aforementioned drawbacks.

SUMMARY

In an embodiment, a radially shearing interferometer comprises: a beam splitter configured to form two optical beams from light entering the interferometer; and a plurality of mirrors arranged so as to produce both a magnified beam and a demagnified beam and provide a common optical path with the magnified beam and the demagnified beam traversing the plurality of mirrors in the opposite direction back to the beam splitter, the plurality of mirrors comprising: a pair of confocal parabolic mirrors, the first of the pair configured to first receive one of the beams from the beam splitter, and reflect the first received beam to a flat mirror configured to reflect the first received beam to the other pair.

In another embodiment, a method for recording an interferogram using a radially shearing interferometer, the method comprises: forming two optical beams from light entering the interferometer using a beam splitter, the optical beams including a magnified beam and a demagnified beam; and providing a common optical path with the magnified beam and the demagnified beam to traverse a plurality of mirrors in the opposite direction back to the beam splitter, the plurality of mirrors comprising: a pair of parabolic mirrors, the first of the pair configured to first receive one of the magnified and demagnified beams, and reflect the first received beam to a flat mirror configured to reflect the first received beam to the other pair.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features illustrated or described in any one embodiment herein can be used in other embodiments as well.

BRIEF DESCRIPTION OF THE DRAWINGS

FIG. 1 illustrates a schematic of a conventional radially shearing interferometer which includes refractive elements.

DETAILED DESCRIPTION

A radially shearing interferometer is described which is composed of substantially of all reflective optical elements. Unlike conventional refractive interferometers, the reflective radially shearing interferometer is achromatic and can be used with multiple wavelengths simultaneously without having to refocus the optics. This is because reflective optics, such as mirrors, do not introduce chromatic aberrations to the wavefront (which refractive optical elements, such as lenses, introduce).

According to one or more embodiments, the interferometer generally includes a beam splitter for dividing the light into two optical beams that are separately magnified or demagnified by the following optical elements. The interferometer provides a common path layout configuration formed of a plurality of mirrors and the beam splitter for both the magnified beam and the demagnified beam that ensures that the two optical beam paths are of appropriate relative signal strength, but traverse in opposite directions. The magnified and demagnified beams interfere at the same location or plane, for instance, a measurement surface.

In some instances, an imaging device may be positioned at a pupil plane of both the magnified beam and the demagnified beam so as to record the interference of the two beams. However, it should be appreciated, alternatively or additionally, that one can visually inspect the interference patterns as well with the "naked eye." For instance, those skilled in the art may have sufficient experience to appreciate and evaluate interference phenomenon.

In some embodiments, the interferometer may be constructed to correct for aberrations. For instance, one or more of the mirrors may be simple paraboloids which are commercially available. Of course, other types of mirrors might also be used, such as, spherical mirrors, if their F-number is large (e.g., above F-8) and the resulting wavefront error is acceptable.

The interferometer may be used for various applications including, for instance, astronomy and other space imaging applications, where it may be desired to capture the wavefront of a distant object with small angular extent or to measure the wavefront for adaptive optics correction. In addition, the interferometer can be used in many optical metrology applications such as optical element testing and low power laser beam wavefront measurements.

Accordingly to another embodiment, a method for imaging or recording a radially shearing interferogram (or a photographic record of an inference pattern) is also disclosed. For example, the interferogram may be used to record an incoherent hologram of an object with a small angular extent, such as, 0.5 degrees. This may have useful application in microscopic or lithographic applications, for example.

Figure 2:
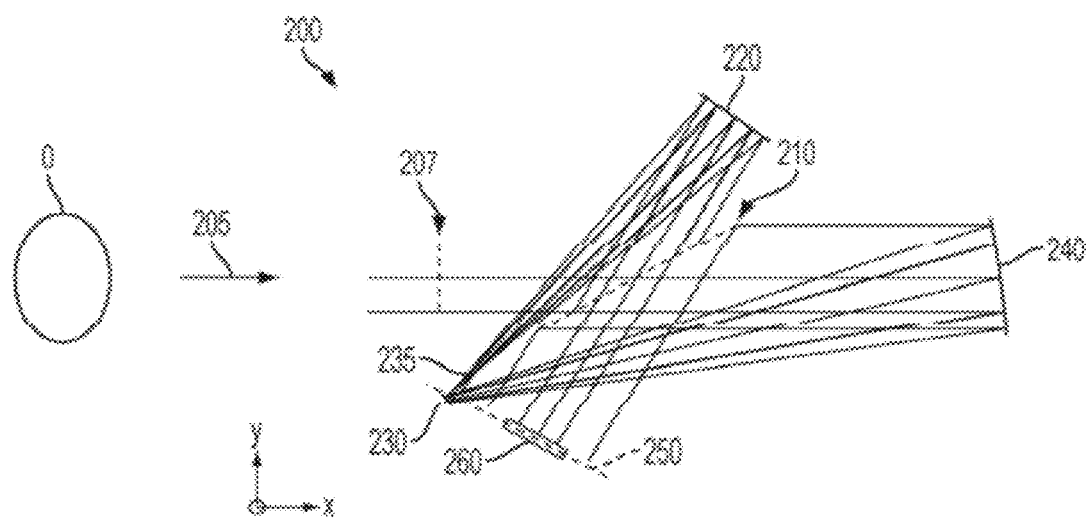
FIG. 2 illustrates a schematic of an all-reflective radially shearing interferometer in accordance with an embodiment.

FIG. 2 illustrates a schematic of an all-reflective radially shearing interferometer 200 in accordance with an embodiment.

Figure 2A:
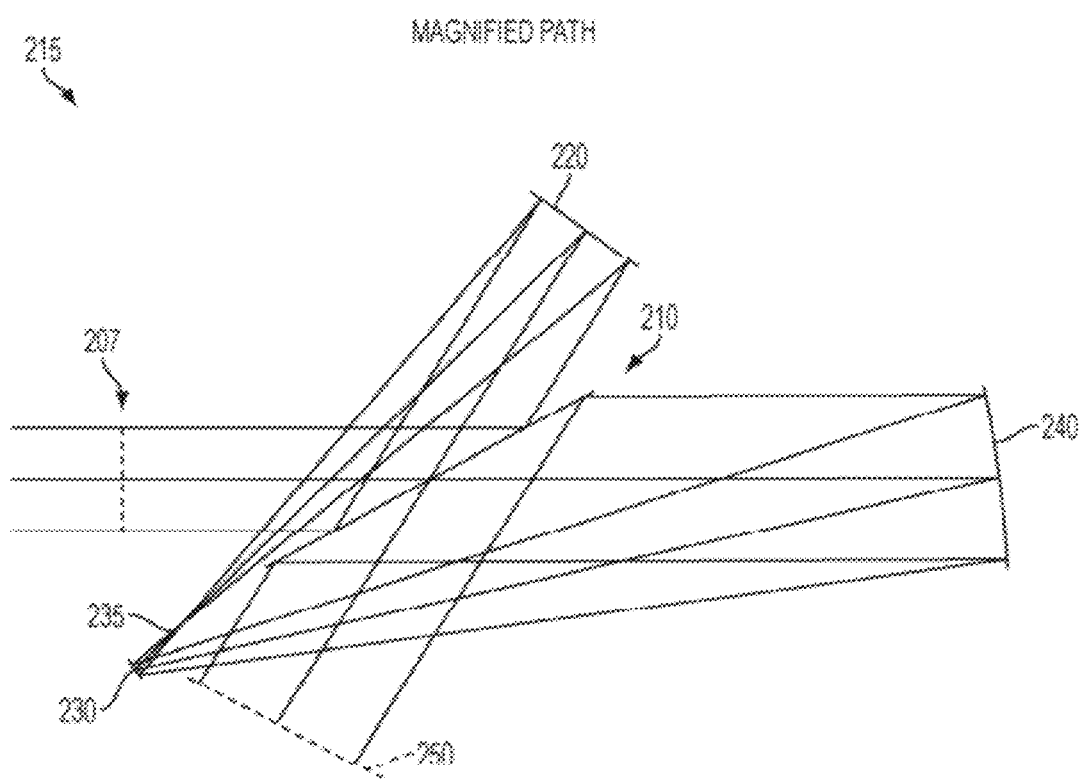
FIG. 2A more clearly illustrates the magnified beam path, and FIG. 2B more clearly illustrates the demagnified beam path of the interferometer shown in FIG. 2.

As illustrated, interferometer 200 is configured in a cyclical geometry. It will be appreciated though that interferometer 200 can be configured in other geometries in other implementations. Both light ray paths have been traced in FIG. 2. FIG. 2A more clearly illustrates first magnified beam path 215 and FIG. 2B more clearly illustrates second demagnified beam path 225 of interferometer 200.

Collimated light beam 205 from distant object O enters entrance pupil 207 of interferometer 200 and impinges upon beam splitter 210. In some implementations, the object distance may be much greater than (e.g., 20 times) the focal length of the larger of the focal lengths of mirror 220 or mirror 240.

A portion of beam 205 is reflected by beam splitter 210 and a portion of beam 205 passes through beam splitter 210, yielding first beam portion 215 and second beam portion 225, respectively. Interferometer 200 is of a common path configuration since both first and second beam portions 215, 225 traverse the same optical path within the interferometer 200 but in opposite directions. This common path configuration allows interferometer 200 to be less sensitive to small thermal and/or mechanical deviations and provides identical optical path lengths for the two paths. This feature may become more important as the spectral bandwidth of the light increases and the corresponding coherence length decreases.

First beam portion 215 is reflected by beam splitter 210 and experiences a spatial magnification of M, where M is the ratio of the focal length of mirrors 240 to 220, on its path to the exit pupil 250. First beam portion 215 is reflected by first mirror 220 through intermediate focus point 235, reflected by second mirror 230, reflected by third mirror 240 and then is reflected again by beam splitter 210 to exit pupil 250. Sensor 260 may be located at exit pupil 250.

Sensor 260 may include any two-dimensional (2-D) sensor configured to detect electromagnetic radiation (light). Exemplary sensors may include complementary metal-oxide-semiconductor (CMOS), charge-coupled device (CCD), or other detectors having sufficient spectral response to detect light of interest, for example, in the infrared (IR), visible (VIS), and/or ultraviolet (UV) spectra and generate electrical signals in response thereto.

Second beam portion 225 passes through beam splitter 210 and experiences a spatial magnification of $$\frac{1}{M}$$

on its path to the exit pupil 250. Second beam portion 225 is reflected by third mirror 240, is reflected by second mirror 230 through intermediate focus point 235, reflected by first mirror 220 and passes back through beam splitter 210 to exit pupil 250.

First and third mirrors 220, 240 may be parabolic mirrors and second mirror 230 may be a flat (fold) mirror. In other implementations, additional mirrors and/or mirrors with other profiles might provide a larger usable field of view.

Another desirable aspect of the optical design shown in FIG. 2 is that the exit pupils for both the magnified and demagnified paths coincide and are accessible and real (i.e., not virtual.) This may be accomplished by positioning the entrance and exit pupil locations to be equidistant from beam splitter. The two wavefronts that interfere can therefore be at the same image location. This may be useful, for instance, where the field of view is nontrivial and/or the interferometer is preceded of followed by another optical system.

Figure 4:
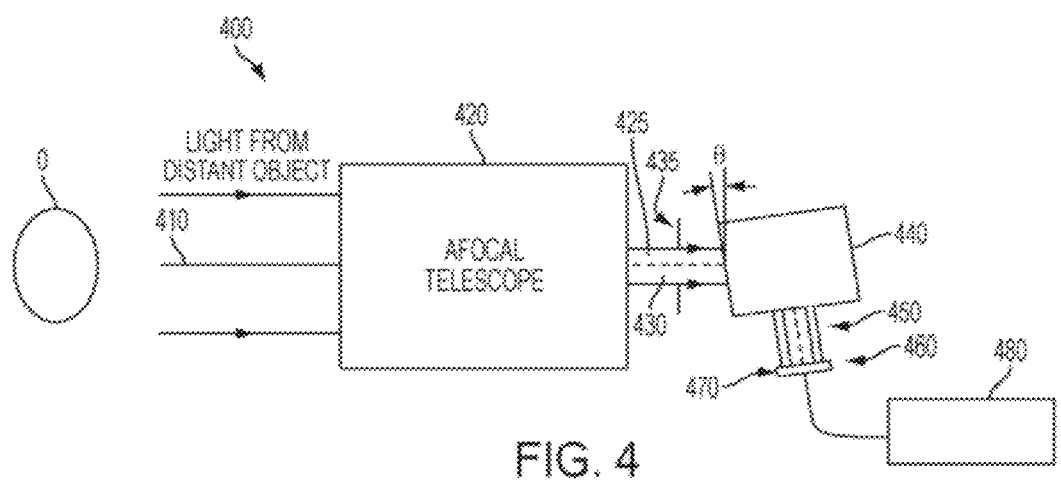
FIG. 4 illustrates a schematic of an interferometry system for recording the waveform of an object in accordance with an embodiment.

Because interferometer 200 is substantially all-reflective, the design is inherently achromatic. And, once aligned, interferometer 200 may be used over various spectral bands, without refocusing. This may include light in the infrared (IR), visible (VIS) and/or ultraviolet (UV) spectra. In some implementations, interferometer 200 may be used positioned behind a telescope system for sensing applications as illustrated in FIG. 4.

FIG. 2C illustrates one exemplary optical prescription for the magnified beam path illustrated in FIG. 2A in accordance with an embodiment. FIG. 2D illustrates one exemplary optical prescription for the demagnified path illustrated in FIG. 2B in accordance with an embodiment.

In the optical prescriptions, CC is the conic constant, Y is a decenter in the y direction, and Alpha is a tilt about the x-axis. Since the demagnified path is opposite to the magnified path, some values for corresponding optical elements in the optical prescriptions illustrated in FIGS. 2C and 2D may be negative with respect to each other.

The optical prescriptions were computed for light entering the entrance pupil as illustrated. Although, it will be appreciated that, in some implementations, the entrance and exit pupils of interferometer 200 may be interchanged, i.e., the light can enter at the exit pupil and the detector placed at the entrance pupil location. In such case, the demagnified path becomes the magnified path and vice versa.

Beam portions 215, 225 experience different magnifications M and $$\frac{1}{M},$$

respectively, because they travels the optical system in opposite directions.

In one embodiment, the magnification $$M \text{ is } \frac{1+\sqrt{5}}{2}$$

or about 1.618. For this particular magnification, tilted plane waves entering interferometer 200 are recorded with the same tilt in the recorded interferogram; for instance, 1 milli-radian. The tilted beam can also be produced by tilting the optical axis of the interferometer at an angle with respect to the entering wavefront to allow the recording of an off-axis hologram.

In some implementations, first and third mirrors 220, 240 may be configured as essentially a folded version of a pair of confocal paraboloids (also referred to in the art as the Gregorian configuration). This means that first and third mirrors 220, 240 share their foci. This configuration corrects the third order aberrations of spherical, coma, and astigmatism. Distortion and Petzval curvature may not be fully corrected in all instances. However, many applications exist for small fields of view that do not require correction of these types of aberrations.

Figure 3:
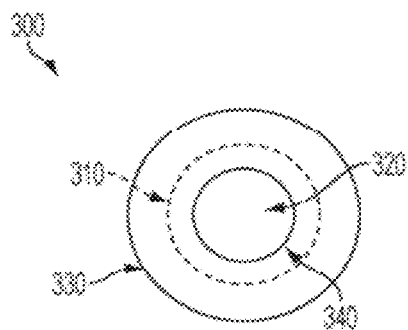
FIG. 3 illustrates an exemplary interferogram formed at the exit pupil of an interferometer in accordance with embodiment.

FIG. 3 illustrates exemplary interferogram 300 formed at the exit pupil of an interferometer in accordance with an embodiment.

Original pupil image 310 is illustrated for reference. Interferogram 300 includes interference fringes 320 formed at the overlap between magnified pupil 330 and demagnified pupil 340 for a tilted plane wave entering the interferometer 200.

It is known that a radially shearing interferometer reproduces a scaled version of the input wave at the output. That is, if a tilted plane wave enters the interferometer, the recorded interference pattern is also of a scaled plane wave. Since any wavefront can be decomposed into a sum of plane waves, this means that there is a simple relationship between the recorded waveform and the input waveform via the Fourier transform. This simplifies the reconstruction of unknown wavefronts. However, not all interferometers have such a simple relationship between the input waveform and the recorded waveform. In addition, by using a radially shearing interferometer, only a single exposure is needed to record the waveform.

The following paragraphs describe mathematically the operation of the interferometer illustrated in FIG. 2. $U_0$ is the wave amplitude of a plane wave entering the interferometer and may be defined as follows:

$$U_0(x, y) = A\exp\left[j\frac{2\pi}{\lambda}(\sin\theta_x x + \sin\theta_y y)\right]circ\left(\frac{r}{r_0}\right),$$

where A is the complex amplitude of the wavefront, $j=\sqrt{-1}$, $\lambda$ is the wavelength, and $r_0$ is the radius of the entrance pupil aperture. The circ function describes the circular pupil aperture and may be defined as follows:

$$circ(r) = \begin{cases} 1 & \text{if } r < 1 \\ 0 & \text{else} \end{cases}$$

The magnified beam at the exit pupil, as depicted in FIG. 2A and which reflects off the beam splitter twice, may be defined by $$U_1(x, y) = r^2\frac{A}{M}\exp\left[j\frac{2\pi}{\lambda}\frac{1}{M}(\sin\theta_x x + \sin\theta_y y)\right]circ\left(\frac{r}{Mr_0}\right),$$

where r is the amplitude reflectance of the beam splitter and M is the magnification.

Figure 2B:
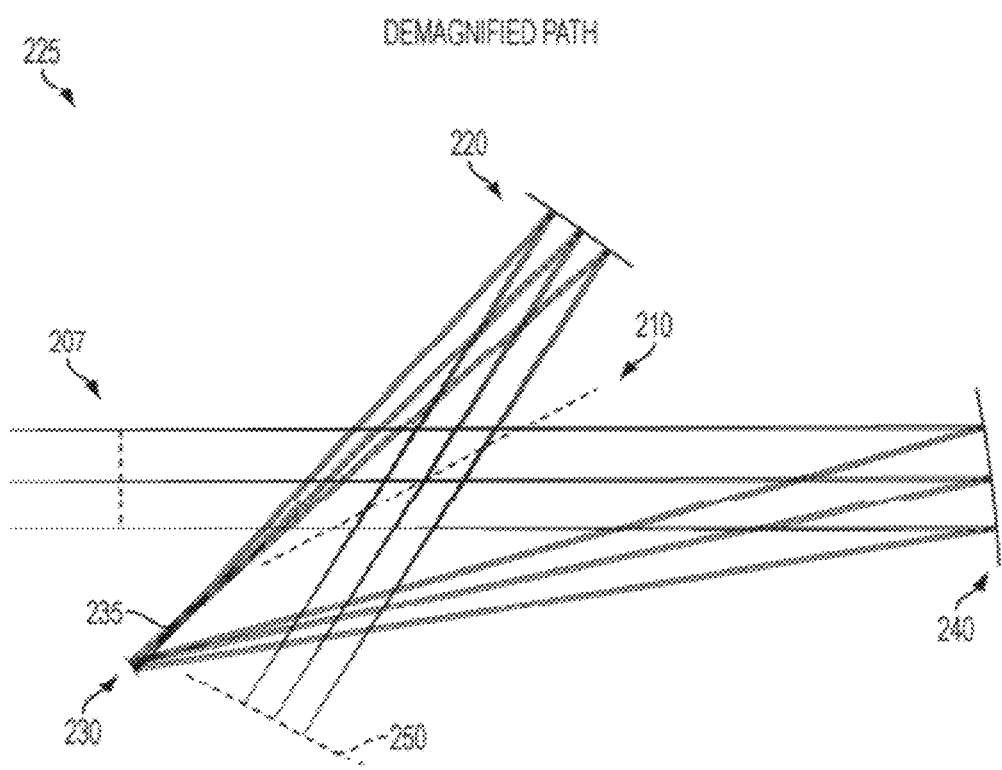
FIG. 2C illustrates one exemplary optical prescription for the magnified beam path illustrated in FIG. 2A in accordance with an embodiment.
FIG. 2D illustrates one exemplary optical prescription for the demagnified path illustrated in FIG. 2B in accordance with an embodiment.

The demagnified beam at the exit pupil, as depicted in FIG. 2B and which transmits through the beam splitter twice, may then be defined as $$U_2(x, y) = t^2 MA\exp\left[j\frac{2\pi}{\lambda}M(\sin\theta_x x + \sin\theta_y y)\right]circ\left(\frac{r}{r_0/M}\right),$$

where t is the amplitude transmittance of the beam splitter and 1/M is the magnification.

The irradiance of the interference pattern at the exit pupil location may be given by $$I(x, y) = |U_1(x, y) + U_2(x, y)|^2$$

$$= |t|^4|A|^2M^2 circ\left(\frac{r}{r_0/M}\right) + \frac{|r|^4|A|^2}{M^2}circ\left(\frac{r}{Mr_0}\right) +$$

$$2|trA|^2 circ\left(\frac{r}{r_0/M}\right)circ\left(\frac{r}{Mr_0}\right)\cos$$

$$\left[\frac{2\pi}{\lambda}\left(M-\frac{1}{M}\right)(\sin\theta_x x + \sin\theta_y y)\right] + \varphi\bigg],$$

where the first two terms are essentially bias terms and the last term gives the recorded fringes, similar to the information of a hologram. The phase $\phi$ is introduced by the beam splitter. The recorded fringes may be a scaled version of the initial plane wave, $U_0$, which entered the interferometer. As in holography, the wavefront and its complex conjugate can be recorded and reconstructed using similar techniques. By tilting the input wave relative to the interferometer, in some instances, an off-axis hologram can be recorded which allows the desired wave information to be separated from the complex conjugate portion.

By choosing the magnification such that $$\left(M - \frac{1}{M}\right) = 1,$$

the recorded plane wave can have the same angular tilt as the plane wave entering the optical system. The solution for the magnification is $$\frac{1 \pm \sqrt{5}}{2},$$

which can also be written as $$\frac{1+\sqrt{5}}{2} \text{ and } \frac{-2}{1+\sqrt{5}}.$$

Because interferogram 300 is formed from the interference of magnified and demagnified beams, the irradiance of the beams will generally be different (unless some action is taken). For example, the reflection-to-transmission-splitting ratio of the beam splitter may be used to equalize the irradiances of the two interfering beams and therefore maximize the contrast of recorded interferogram 300. The contrast of the recorded fringes may be at a maximum when the magnified amplitude, $U_1(x,y)$, is substantially equal to the amplitude of the demagnified beam, $U_2(x,y)$. This occurs when $$|t|^2 M = \frac{|r|^2}{M}$$

where M is the magnification of the optical system, and t is the amplitude transmittance and r is the amplitude reflectance of the beam splitter If the beam splitter is modeled as a lossless device then $$|r|^2 + |t|^2 = 1.$$

Combining the previous two equations, the intensity transmission of the beam splitter, T, which may provide a maximum fringe contrast is given by the following equation:

$$T = |t|^2 = \frac{1}{1+M^2},$$

and the corresponding intensity reflectance, R, of the beam splitter may be given by:

$$R = |r|^2 = \frac{M^2}{1+M^2}.$$

FIG. 4 illustrates a schematic of an interferometry system 400 for recording the waveform of an object in accordance with an embodiment.

System 400 generally includes afocal telescope 420, aperture stop 430, interferometer 440, image sensor 470 and signal processor 480.

Light beam 410 from distant object O enters afocal telescope 420 which is configured to generate collimated light beam 425. In one embodiment, the afocal telescope 420 does not have a central obscuration which would remove information from the center of the recorded interferogram.

Collimated light beam 425 enters entrance pupil 435 of all-reflective radially shearing interferometer 440. In some instances, controllable aperture stop 430 may be located at entrance pupil 435 which is configured to better control the input collimated light beam to interferometer 440 (which may be configured according to one or more embodiments described herein). Interferometer 440 generates sheared wavefronts 450 which form interference fringes at exit pupil 460 where image sensor 470 may be located.

Image sensor 470 may include any two-dimensional (2-D) or three-dimensional (3-D) image sensors that are configured to detect electromagnetic radiation (light) corresponding to the entering light of interest.

Exemplary image sensors may include complementary meta-oxide-semiconductor (CMOS), charge-coupled device (CCD), or other imaging devices having sufficient pixel resolution to detect interference patterns of entering light of interest. In one implementation, image sensor 470 may be a focal plane array (FPA) sensor. Output from sensor 470 may be input to signal processor 480 which is configured to process interference image generated by interferometer 440.

Signal processor 480 may include hardware, such as Application Specific Integrated Circuits (ASICs), Field Programmable Gate Arrays (FPGAs), digital signal processors (DSPs), or other integrated formats. However, those skilled in the art will recognize that the signal processor 480 may, in whole or in part, can be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as software (firmware), or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium used to carry out the distribution.

In order to faithfully image or record the wavefront, in some instances, input beam may be slightly tilted at angle δ with respect to the optical axis of interferometer 440. For example, the input beam may be tilted a few milliradians with respect to the optical axis. As a result, the input beam will be recorded as an off-axis hologram, and the wavefront can be separated from the direct current ("DC") components of the hologram. In one implementation, the interferometer 440 may be tilted at about 2 milli-radians.

Figure 5:
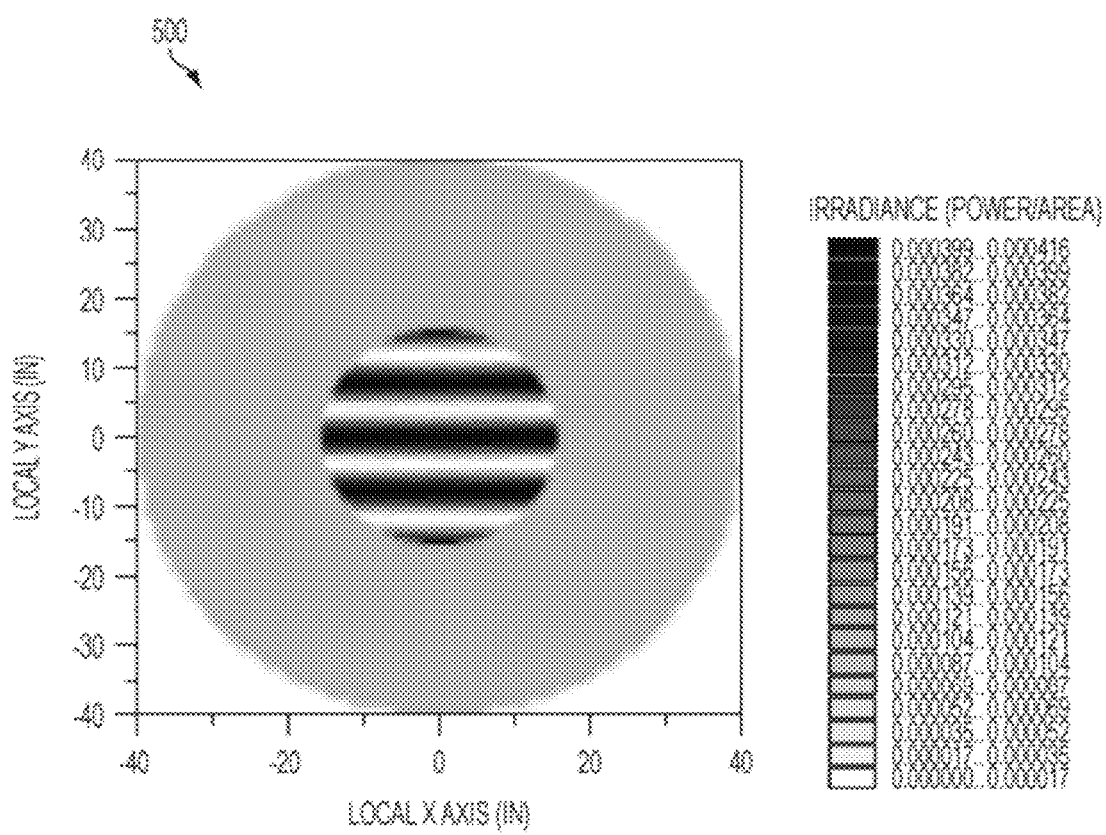
FIG. 5 illustrates simulated interferogram for a single off-axis plane wave in accordance with an embodiment.

FIG. 5 illustrates simulated interferogram 500 for a single off-axis plane wave in accordance with an embodiment. In this case, the interferometer was tilted 0.02 degrees to illustrate a small number of fringes.

The beam splitter ratio splitting ratio was chosen to maximize the contrast. In this case, the magnification of the system was 1.618 and the reflected to transmitted intensity ratio was 2.618, in accordance with the equations given previously. The figure illustrates that a maximum contrast is achieved. The units in this figure represent irradiance [$W/mm^2$].

Figure 6A:
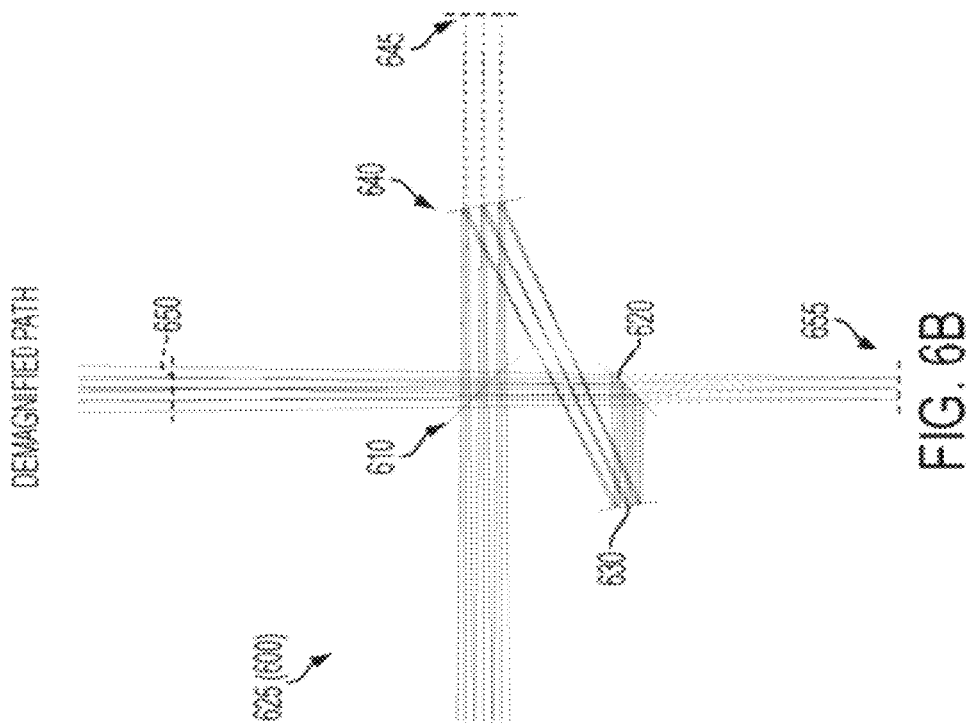
FIGS. 6A and 6B illustrate a schematic of another all-reflective radially shearing interferometer in accordance with an embodiment.
Figure 6B:
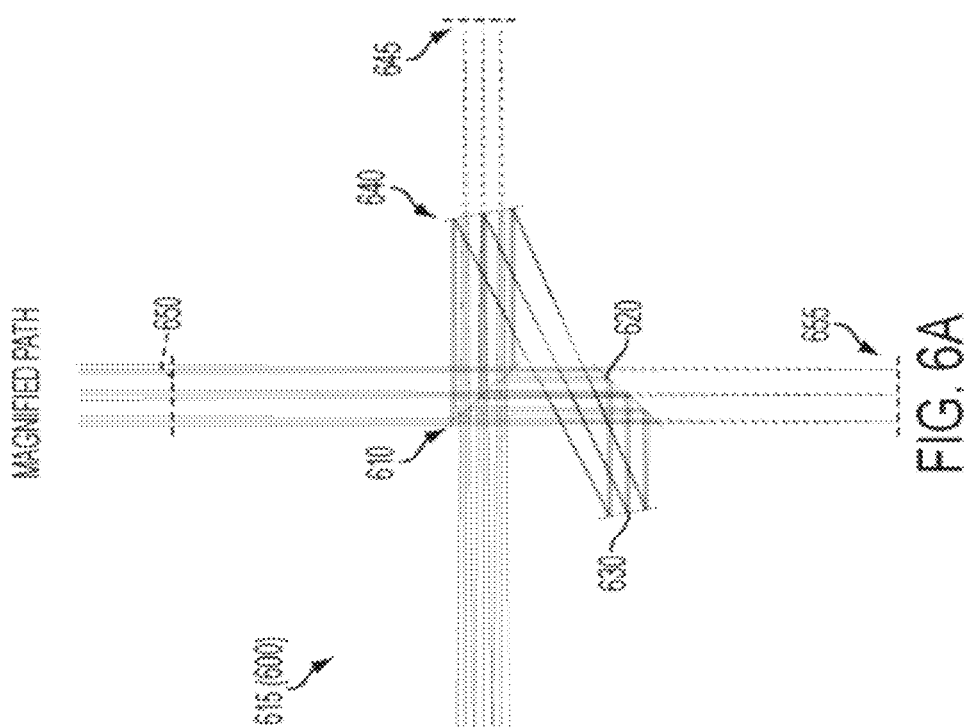

FIGS. 6A and 6B illustrate a schematic of another all-reflective radially shearing interferometer 600 in accordance with an embodiment. Interferometer 600 is of a common path configuration design and includes beam splitter 610, flat (fold) mirror 620, and a pair of confocal parabolic mirrors 630, 640 arranged in the afocal Mersenne telescope configuration.

As known in the art, the Mersenne telescope configuration includes two confocal parabolic mirrors at infinite conjugates, in which one mirror has a positive focal length and the other mirror has a negative focal length. See, e.g., *Handbook of Optics,* Vol. II, Second Edition, McGraw-Hill, Inc. New York, 1995, Chapter 18, p. 10, herein incorporated by reference.

In interferometer 600 illustrated in FIGS. 6A and 6B, mirror 630 has a negative focal length and mirror 640 has a positive focal length.

FIG. 6A illustrates first magnified beam path 615 and FIG. 6B illustrates second demagnified beam path 625 of interferometer 600. In one embodiment, interferometer 600 is configured to have a magnification of 1.618.

First beam path 615 is reflected by beam splitter 610, reflected by flat mirror 620, reflected by each of confocal mirrors 630, 640 and is reflected again by beam splitter 610 toward plane 650.

Second beam path 625 is passed through beam splitter 610, reflected by each of confocal mirrors 640, 630, reflected by flat mirror 620, and is passed again through beam splitter 610 toward plane 650.

Plane 650 represents one possible location where the interference of the two light beams along paths 615, 625 can be viewed and/or measured as the light propagates away from the beam splitter 610. In some implementations, a sensor, for example, similar to sensor 260 (FIG. 2) may be positioned at plane 650. It should be appreciated that other locations for viewing and/or measuring interference of the two light beams along paths 615, 625 are also possible. However, it should be appreciated, alternatively or additionally, that one can visually inspect the interference patterns as well with the "naked eye." For instance, those skilled in the art may have sufficient experience to appreciate and evaluate the interference phenomenon.

Interferometer 600 has the benefit that collimated light entering interferometer 600 does not come to a focus. This may allow interferometer 600 to be used with high power lasers, such as femto-second lasers, where air breakdown at focal points could limit the design. As with the embodiments presented above, the optical system can be constrained so that the entrance and exit pupils for both beam paths 615, 625 are coincident at 645 and 655, respectively. However, it will be appreciated that pupils 645 and 655 are "virtual pupils."

As used herein, "virtual pupil" means light would ordinary focus at these locations if it could get there. For instance, in the arrangement shown in FIGS. 6A and 6B, light is prevented from reaching virtual entrance pupil 645 by positive focal length confocal parabolic mirror 640, and light is prevented from reaching virtual exit pupil 655 by flat fold mirror 620. Additional optics may be necessary to form a real image of each of virtual pupils 645, 655.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A radially shearing interferometer comprising:
a beam splitter configured to form two optical beams from light entering the interferometer, wherein the entering light is tilted at an angle with respect to an objective axis of the interferometer; and
a plurality of mirrors arranged so as to produce both a magnified beam and a demagnified beam and provide a common optical path with the magnified beam and the demagnified beam traversing the plurality of mirrors in the opposite direction back to the beam splitter, the plurality of mirrors comprising:
a pair of confocal parabolic mirrors, the first of the pair configured to first receive one of the beams from the beam splitter, and reflect the first received beam to a flat mirror configured to reflect the first received beam to the other of the pair.

2. The interferometer according to claim 1, further comprising:
an imaging device positioned at an exit pupil plane of the magnified beam and the demagnified beam so as to record the interference of both beams.

3. The interferometer according to claim 1, wherein the magnified beam is formed by a portion of entering light being reflected from the beam splitter, and the demagnified beam is formed by a portion of entering light passing through the beam splitter.

4. The interferometer according to claim 1, wherein the magnified beam has an angular magnification M and the demagnified beam has an angular magnification of $$\frac{1}{M}.$$

5. The interferometer according to claim 4, wherein M is about 1.618.

6. The interferometer according to claim 1, wherein an imaging device is positioned at the same tilt as the entering light.

7. The interferometer according to claim 1, further comprising:
an afocal or focal telescope positioned ahead of the interferometer that is configured to collimate the entering light.

8. The interferometer according to claim 1, wherein the beam-splitting-ratio of the beam splitter is configured to substantially equalize the irradiances of the magnified and demagnified beams.

9. The interferometer according to claim 1, wherein the confocal parabolic mirrors are arranged in a Mersenne configuration in which one of said mirrors has positive focal length and the other of said mirrors has a negative focal length.

10. The interferometer according to claim 1, wherein the exits pupils for both the magnified and demagnified beam paths coincide.

11. A method for recording an interferogram using a radially shearing interferometer, the method comprising:
forming two optical beams from light entering the interferometer using a beam splitter, the optical beams including a magnified beam and a demagnified beam, wherein the entering light is tilted at an angle with respect to an objective axis of the interferometer; and
providing a common optical path with the magnified beam and the demagnified beam to traverse a plurality of mirrors in the opposite direction back to the beam splitter, the plurality of mirrors comprising:
a pair of parabolic mirrors, the first of the pair configured to first receive one of the magnified and demagnified beams, and reflect the first received beam to a flat mirror configured to reflect the first received beam to the other of the pair.

12. The method according to claim 11, further comprising:
recording the interference of the magnified and demagnified beams using an imaging device positioned at an exit pupil plane of the magnified and the demagnified beams.

13. The method according to claim 11, wherein the magnified beam is formed by a portion of entering light reflecting from the beam splitter, and the demagnified beam is formed by a portion of entering light passing through the beam splitter.

14. The method according to claim 11, wherein the magnified beam has an angular magnification M and the demagnified beam has an angular magnification of 1/M.

15. The method according to claim 14, wherein M is about 1.618.

16. The method according to claim 11, further comprising:
positioning an imaging device at the same tilt as the entering light.

17. The method according to claim 11, further comprising:
positioning an afocal or focal telescope ahead of the interferometer so as to collimate the entering light.

18. The method according to claim 11, wherein the beam-splitting-ratio of the beam splitter is configured to substantially equalize the irradiances of the magnified and demagnified beams.

19. The method according to claim 11, wherein the confocal parabolic mirrors are arranged in a Mersenne configuration in which one of said mirrors has positive focal length and the other of said mirrors has a negative focal length.

20. The method according to claim 11, wherein the exit pupils for both the magnified and demagnified paths coincide.

* * * * *